(12) United States Patent
Hobbet et al.

(10) Patent No.: US 7,934,072 B2
(45) Date of Patent: Apr. 26, 2011

(54) SOLID STATE STORAGE RECLAMATION APPARATUS AND METHOD

(75) Inventors: Jeffrey Hobbet, Holly Springs, NC (US); Takashi Sugawara, Tokyo (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 614 days.

(21) Appl. No.: 11/864,106

(22) Filed: Sep. 28, 2007

(65) Prior Publication Data

US 2009/0089518 A1 Apr. 2, 2009

(51) Int. Cl.
*G06F 12/00* (2006.01)
(52) U.S. Cl. .......................... 711/202; 711/155
(58) Field of Classification Search .......... 711/103, 711/202, 154, 155, 207
See application file for complete search history.

(56) References Cited

U.S. PATENT DOCUMENTS

2006/0224851 A1* 10/2006 Tamura et al. .............. 711/170
2007/0208904 A1* 9/2007 Hsieh et al. ................. 711/103

FOREIGN PATENT DOCUMENTS

WO   WO 2009117251 A1 *  9/2009

* cited by examiner

*Primary Examiner* — Pierre-Michel Bataille
(74) *Attorney, Agent, or Firm* — Kunzler Needham Massey & Thorpe

(57) ABSTRACT

A method and apparatus are disclosed for reclaiming solid state storage with limited write cycles such as flash memory. Through the use of shared storage for common data patterns, physical space may be conserved or reclaimed in a solid state device. The apparatus may use internal mappings and/or external device drivers to handle the reclamation of unused space. By enabling reclamation of physical space, the disclosed systems, apparatus, and methods may provide more efficient read and write access and improved wear leveling.

18 Claims, 5 Drawing Sheets

SOLID STATE STORAGE RECLAMATION APPARATUS AND METHOD

FIELD OF THE INVENTION

The invention relates to the improvement of wear leveling on solid state devices with limited write cycles. Specifically, the invention relates to devices, methods, and systems to reclaim physical locations on solid state storage devices with limited write cycles.

DESCRIPTION OF THE RELATED ART

Solid state storage devices use arrays of storage cells to create non-volatile memory. In flash devices, both single level and multi-level cells may be implemented as long term storage units. Single level cells (SLC) store a single bit and typically last for approximately one hundred thousand program or erase cycles with currently available technology. Multi-level cells (MLC) hold variable charges and more information, but suffer a greater failure rate than single level cells. A typical program/erase specification for MLC is currently 10,000 cycles.

In both cases, wear leveling algorithms may be implemented to prevent repetitive write operations to the same cells. Wear leveling algorithms typically improve the writing process by distributing write operations to little used or unused cells in a storage device. Wear leveling algorithms operate more efficiently when a greater number of cells within the storage device are available are unused. Under such conditions the wear leveling algorithms may significantly reduce the average number of write operations to each cell and thereby increase the life of solid state storage device.

SUMMARY OF THE INVENTION

The present invention has been developed in response to the present state of the art, and in particular, in response to the problems and needs in the art that have not yet been fully solved by currently available solid state space reclamation methods. Accordingly, the present invention has been developed to provide an apparatus and method to facilitate solid state storage reclamation that overcomes many or all of the above-discussed shortcomings in the art.

One method disclosed herein includes, in certain embodiments, receiving a write command and associated data for a logical unit of storage, writing the associated data to a physical unit of storage, and mapping the logical unit of storage to a physical unit of storage if the associated data does not comprise a common pattern. If the associated data comprises a common pattern, the logical unit of storage may be mapped to a common pattern.

Mapping the logical unit of storage to a common pattern may comprise inserting a unique code or storage location corresponding to the common pattern into a mapping table. Alternately, in one embodiment, deleting a logical address from a mapping table may effectively map the logical address to the common pattern.

In another aspect of the present invention, an apparatus includes a solid state storage array, an interface module configured to receive a write command and associated data for a logical unit of storage, and a storage control module configured to write the associated data to a physical unit of storage within the solid state storage array.

The storage control module may be further configured to map the logical unit of storage to the physical unit of storage if the associated data does not comprise a common pattern. Additionally, the storage control module may be configured to map the logical unit of storage to a common pattern if the associated data comprises a common pattern and reclaim a physical unit of storage for wear leveling if the associated data comprises a common pattern.

In another aspect of the present invention, a method comprises receiving a delete instruction for a logical unit of storage and overwriting the logical unit of storage with a common data pattern. In one embodiment, the method includes reclaiming a physical unit of storage corresponding to the logical unit of storage. The physical unit of storage may be reclaimed for wear leveling use.

In another aspect of the present invention, a system includes a computing device comprising a storage driver configured to receive a delete instruction for a logical unit of storage. The storage driver may be configured to transmit a write command to a storage device to overwrite the logical unit of storage with a common data pattern. Additionally, the system include a storage device configured to determine a physical unit of storage corresponding to the logical unit of storage and reclaim the physical unit of storage for wear leveling use.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
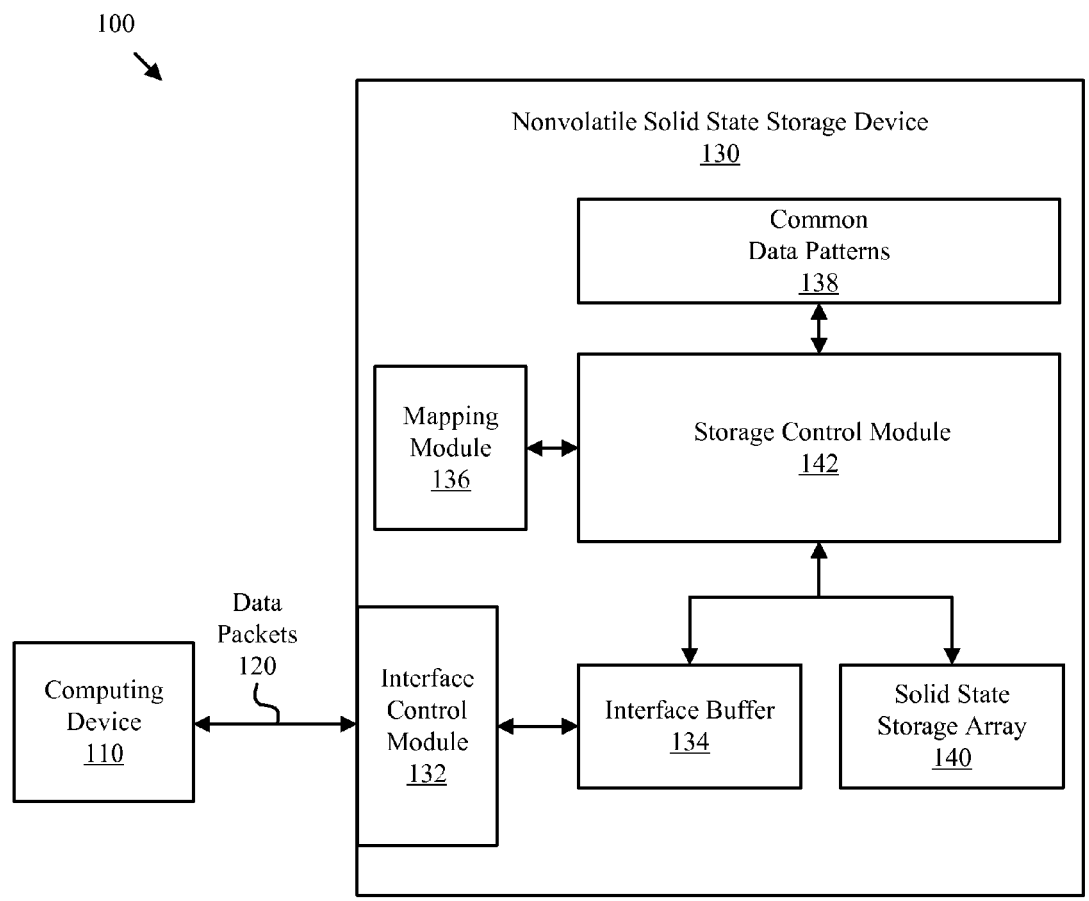
FIG. 1 is a block diagram depicting one embodiment of a solid state storage reclamation system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, solid state memory, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram depicting one embodiment of a solid state storage reclamation system 100 and apparatus 130 in accordance with the present invention. As depicted, the solid state storage reclamation system 100 includes a computing device 110 and a nonvolatile solid state storage device 130 (or simply apparatus 130) which includes an interface control module 132, an interface buffer 134, a mapping module 136, common data patterns 138, a solid state storage array 140, and a storage control module 142. The depicted system enables a computing device 110 to read and write to a nonvolatile solid state storage device 130 while regulating access to the solid state storage array 140. By minimizing the number of reads and writes to the solid state storage array 140, the depicted system and apparatus may provide faster access and less wear on the solid state storage array.

In the depicted embodiment, the computing device 110 is detachable from the nonvolatile solid state storage device 130. In a different embodiment, the solid state storage device 130 may be internal to the computing device 110. Furthermore, the computing device 110 may use the nonvolatile solid state storage device 130 as a primary or secondary storage module.

In the depicted embodiment, the computing device 110 generates data packets 120 that contain read or write instructions, as well as the data to be written or read. The nonvolatile solid state storage device 130 receives the data packets 120 through means of an interface control module 132. The interface control module 132 may be configured to handle device protocols and report any transmission errors to the computing device 110 or the nonvolatile solid state storage device 130.

Additionally, the interface control module 132 may be responsible for transferring data packets to the computing device.

The flow of data packets may be regulated through an interface buffer 134. The interface buffer may temporarily store information and deliver packets to the storage control module 142 as needed. In the depicted embodiment, the storage control module 142 acts as the primary read and write controller for the nonvolatile solid state storage device.

The storage control module 142 may access a mapping module 136, common data patterns 138, and solid state storage array 140 in order to provide read and write functionality to the computing device 110. The mapping module 136 may contain or have access to logical addresses for the data stored in the solid state storage array 140. In one embodiment, the mapping module 136 manages one or more mapping tables that map logical locations to physical data locations in the solid state storage array 140.

In the case of a write operation, the storage control module 142 may interact with the mapping module to determine available physical write locations in the solid state storage array 140. The data may be written to the solid state storage array 140 and a logical to physical mapping may be captured by the mapping module 136.

The mapping module may read mapping table information from the solid state array 140 upon device initialization, store and update the information during operation, and write or initiate the writing of the mapping tables to the solid state storage array 140 for long term storage. The mapping module may implement wear leveling algorithms to distribute the storage of the table to different locations within the solid state array 140 each time the table is written.

When the data to be written to the storage array matches a common pattern, the storage control module 142 may avoid writing the data to the storage array and simply map the logical units of storage to the common pattern. One of skill in the art will appreciate that mapping logical units of storage to one or more common patterns may be accomplished through a variety of means and methods. For example, a particular code or physical storage location corresponding to the common pattern may be inserted into a mapping table. Alternately, entries for the logical units of storage may be deleted from the mapping table indicating that the logical units of storage contain the common (or default) pattern.

In the depicted embodiment, the common patterns are stored in common data patterns area 138 on the nonvolatile solid state storage device 130 which may be within or outside of the storage array 140. In one embodiment, non volatile firmware is used to hold common data patterns. Any type of storage configuration, however, may be implemented to provide storage of common data patterns. SDRAM is one example. Storing or generating common patterns outside of the storage array reduces the I/O load from solid state storage array 140.

Introducing an alternate location for storing or generating common data patterns may provide a significant advantage over prior art implementations. For example, the solid state storage array 140 may not need to be accessed during read or write operations when the data involved is a common pattern. In one embodiment, when a mapping is not found within a mapping table during a read operation, a common data pattern is returned, thereby reducing access to the (potentially high latency) solid state storage array 140 and potentially reducing the required size for the mapping table.

Additionally, the mapping module 136 may contain multiple logical addresses that point to the same physical location. Pointing to the same physical location may eliminate duplicate storage units with the same data pattern on the solid state storage array 140. By minimizing the space used, the nonvolatile solid state storage device may provide additional space for wear leveling algorithms or the like.

Figure 2:
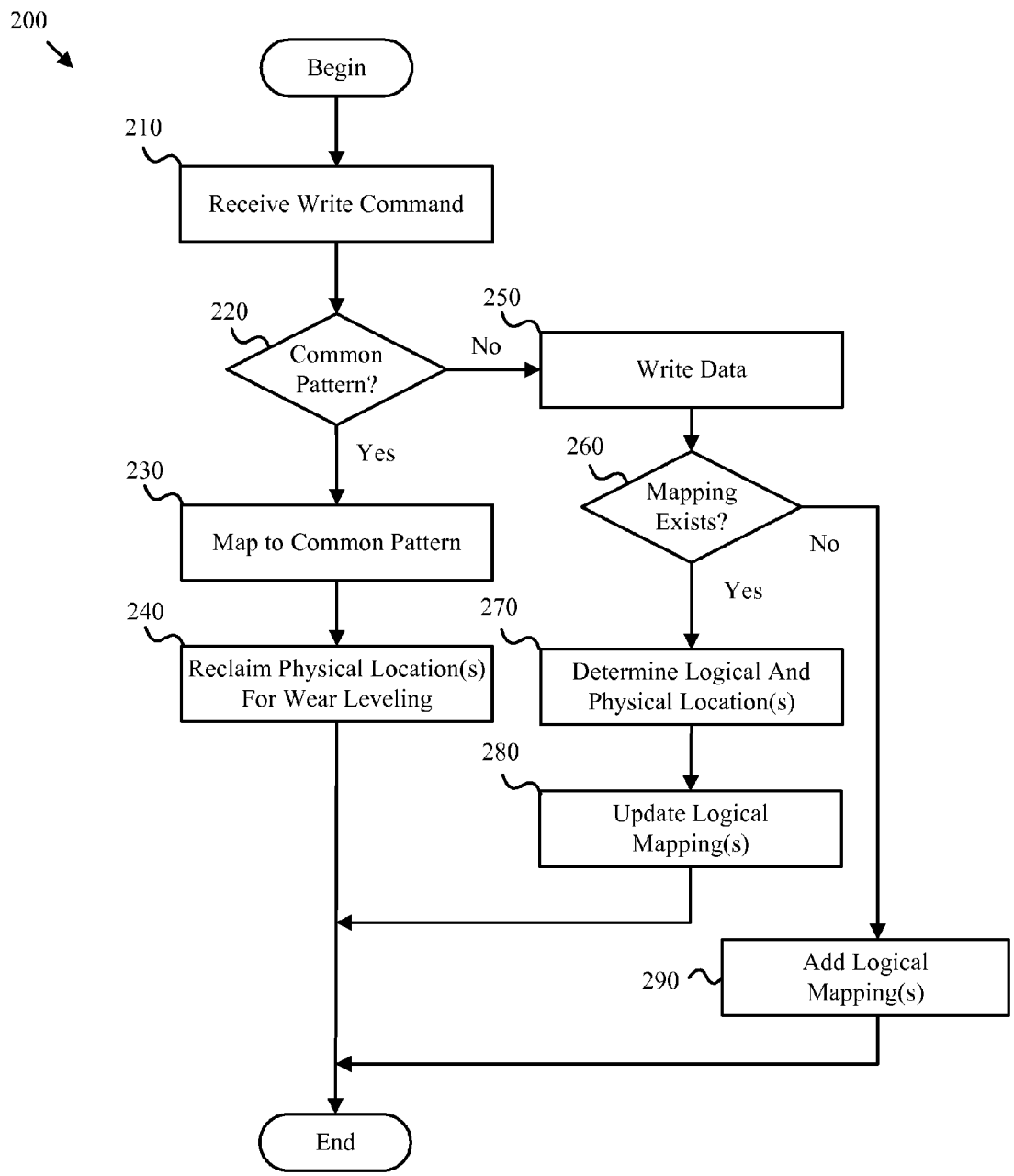
FIG. 2 is a schematic flow chart diagram illustrating one embodiment of a solid state storage reclamation method in accordance with the present invention.

FIG. 2 is a schematic flow chart diagram illustrating one embodiment of a solid state storage reclamation method 200. As depicted, the solid state storage reclamation method 200 includes receiving 210 a write command, determining 220 if the data to be written contains a common pattern, mapping 230 to a common pattern, reclaiming 240 physical locations for wear leveling, writing 250 data, determining 260 if a mapping exists for the data to be written, determining 270 logical and physical write locations, updating 280 one or more mappings, and adding 290 one or more mappings. The solid state storage reclamation method 200 enables reclamation and reuse of solid state storage space by recognizing common patterns and existing mappings during write operations.

Receiving 210 a write command entails accepting both the data and instructions necessary to execute a write process on a solid state device. Determining 220 if the data contains a common pattern entails examining the data for a specified pattern. In one embodiment, the common pattern is a zero level pattern. In another embodiment, the common pattern may include data consistent with a low level formatting algorithm.

If the data does contain a common pattern, the logical storage addresses may be mapped to a common pattern. Mapping logical units of storage to one or more common patterns may be accomplished through a variety of means and methods. For example, a particular code or physical storage location corresponding to the common pattern may be inserted into a mapping table. Alternately, entries for the logical units of storage may be deleted from the mapping table indicating that the logical units of storage contain the common (or default) pattern. Specifically, in one embodiment, the solid state storage device identifies and removes the logical to physical mappings from a mapping table. When the logical storage addresses are removed, the storage control module 142, or the like, may view the corresponding physical locations as available.

Subsequent to mapping 230 to a common pattern the physical units of storage corresponding to the mapped addresses may be reclaimed 240 for subsequent use including implementing wear leveling algorithms. Reclaiming 240 may occur independently of any reclamation command from an external device, device drivers, or external interface. The ability of the device to handle reclamation internally provides a significant advantage particularly in plug and play scenarios. By avoiding the use of external drivers, space reclamation may occur independent of the computing device 110.

When a common pattern is not recognized, the data may written 250 to a physical solid state storage unit such as a sector or block. In one embodiment, the mapping table is examined to determine 260 if a mapping exists for the logical units of storage. If a logical to physical mapping does exist, the logical and physical write locations may be determined 270 and the logical mappings may be updated 280 to reflect the physical locations of the written data. If the mappings do not exist, logical mappings may be added 290 in order to establish a logical to physical mapping for the newly written data.

Figure 3:
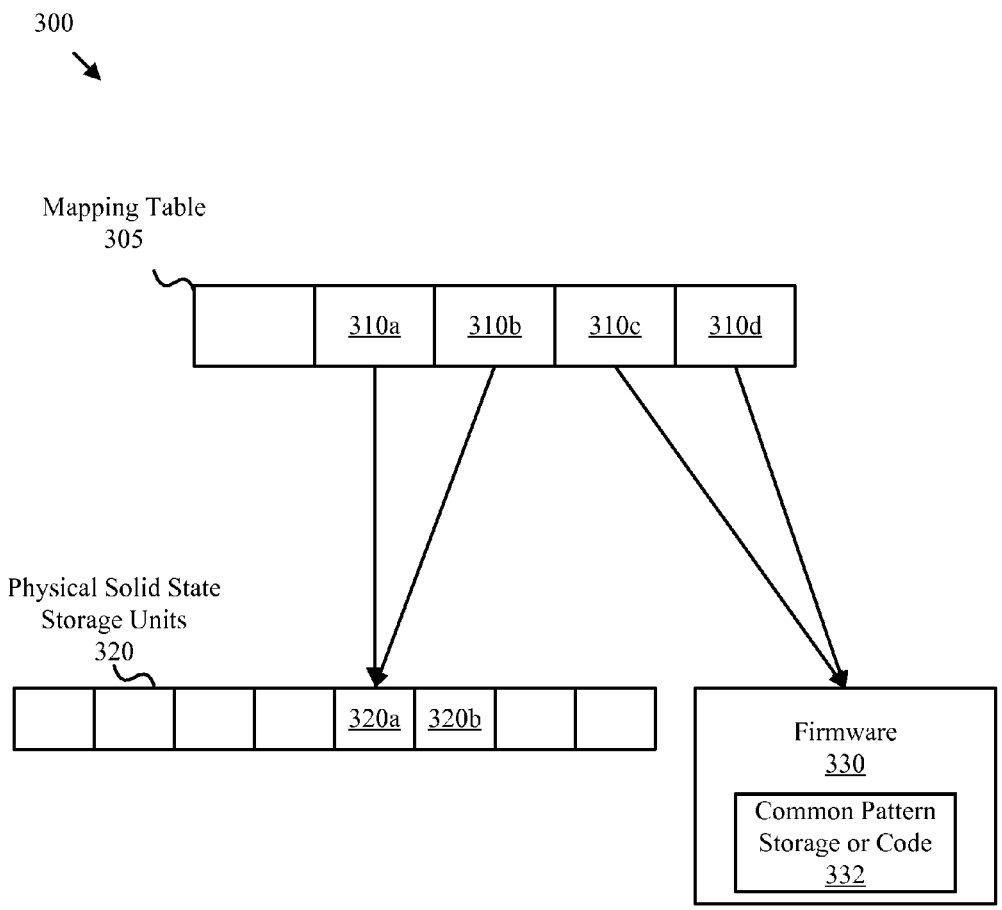
FIG. 3 is a block diagram depicting one embodiment of address mapping in accordance with the present invention.

FIG. 3 is a block diagram depicting one embodiment of an address mapping scenario 300 in accordance with the present invention. As depicted, the mapping scenario 300 includes a mapping table 305, logical address mappings 310, physical solid state storage units 320, firmware 330 with common pattern storage or code 332. Mapping multiple logical storage locations to a single physical location and/or alternative storage locations reduces the number of physical units of storage allocated for data storage within a storage array.

In the depicted embodiment, logical address mappings 310*a* and 310*b* simultaneously reference the same physical solid state storage unit 320*a*. Logical address mappings may also point to alternative sources such as firmware 330. In the depicted example, logical address mappings 310*c* and 310*d* point to firmware locations used as common pattern storage or code 332. For example, the common pattern may be generated by software code 332 for the storage controller 140 or the like. The common pattern storage or code 332 may provide zero level data or other common patterns. In one embodiment, the absence of a logical address from the mapping table 305 indicates that the logical unit of storage contains a common (or default) pattern which may be stored or generated by the firmware 330 or the like. By storing or generating common patterns outside of the physical solid state blocks, more space is made available for future writes and wear leveling processes.

Figure 4:
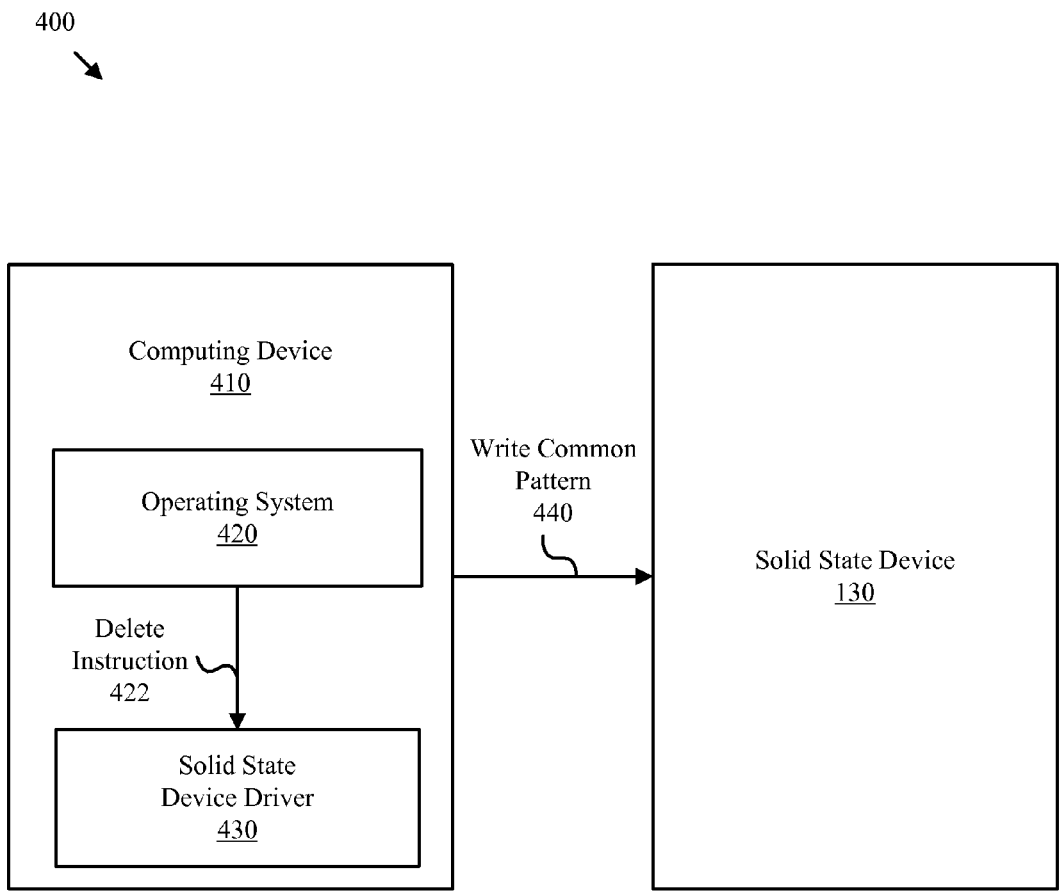
FIG. 4 is a block diagram depicting one embodiment of a solid state storage reclamation system in accordance with the present invention.

FIG. 4 depicts a system 400 configured to reclaim solid state storage. As depicted, the system 400 includes a computing device 410, an operating system 420, a solid state device driver 430, and a solid state storage device 130. The solid state storage reclamation system 400 enables the computing device 410 to indirectly reclaim storage locations on the solid state device 130. By using drivers and an interface, the solid state storage reclamation system 400 enables a computing device 410 to free physical units of storage on the storage device 130 for wear leveling and other uses.

In the depicted embodiment, the computing device 410 includes an operating system 420 and a solid state device driver 430. Although the depicted computing device includes an operating system 420, the solid state device driver 430 may operate independent of an operating system 420 in different embodiments. The operating system 420 or similar storage management module may generate a delete instruction 422.

The solid state device driver 430 may be configured to receive the delete instruction 442 and determine the logical units of storage where common patterns may be written 440 and subsequently freed for use by the solid state storage device 130. In certain embodiments, the solid state storage device 130 may be enclosed within the computing device 410.

Figure 5:
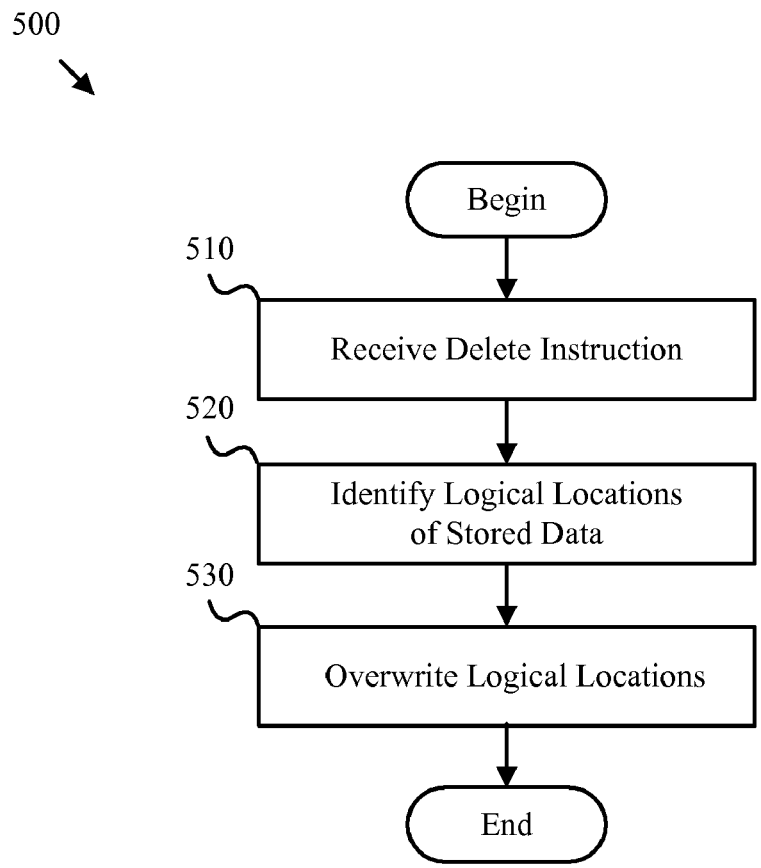
FIG. 5 is a schematic flow chart diagram illustrating one embodiment of a solid state storage reclamation method in accordance with the present invention.

FIG. 5 is a schematic flow chart diagram illustrating one embodiment of a solid state storage reclamation method 500 from the perspective of a device driver on a computing device. As depicted, the solid state storage reclamation method 500 includes receiving 510 a delete instruction, identifying 520 logical locations or units of stored data, and overwriting 530 the logical locations or units of stored data. The solid state storage reclamation method 500 enables physical sectors to be freed since all logical units containing a common pattern will be mapped to the same unit of physical storage.

Receiving 510 a delete instruction includes receiving file information and instructions relating to data on the solid state storage device. Identifying 520 logical addresses of stored data includes determining the logical units of data referenced by the delete instruction. Once the logical locations of the pre-existing data have been established, the locations may overwritten 530 with a common data pattern and thereby mapped to a common pattern by the storage device 130. By overwriting logical units of data that previously pointed to non common data with a common data pattern, the method effectively reclaims storage space within the storage device 130.

What is claimed is:

1. A method, the method comprising:
   receiving a write command and associated data for a logical unit of storage;
   writing the associated data to a physical unit of storage within a solid state storage array;
   mapping the logical unit of storage to the physical unit of storage if the associated data does not comprise a common pattern;
   mapping the logical unit of storage to a common pattern if the associated data comprises a common pattern; and
   reclaiming a physical unit of storage for wear leveling if the associated data comprises a common pattern.

2. The method of claim 1, wherein mapping the logical unit of storage to a common pattern comprises mapping to a physical unit of storage corresponding to the common pattern.

3. The method of claim 1, wherein mapping the logical unit of storage to a common pattern comprises deleting an entry in a mapping table.

4. The method of claim 1, wherein mapping the logical unit of storage to a common pattern comprises inserting a unique code corresponding to the common pattern into a mapping table.

5. The method of claim 1, wherein the common pattern is stored or generated outside of the solid state storage array.

6. A method, the method comprising:
   receiving a write command and associated data for a first logical unit of storage;
   writing the associated data to a physical unit of storage within a solid state storage array;
   mapping the first logical unit of storage to the physical unit of storage if the associated data does not comprise a common pattern;
   reclaiming a physical unit of storage for wear leveling if the associated data comprises a common pattern;
   receiving a delete instruction for a second logical unit of storage; and
   overwriting the a physical unit of storage corresponding to the second logical unit of storage with a common data pattern.

7. The method of claim 6, further comprising reclaiming the physical unit of storage corresponding to the second logical unit of storage.

8. The method of claim 7, wherein the physical unit of storage is reclaimed for wear leveling use.

9. An apparatus, the apparatus comprising:
   a solid state storage array;
   an interface module configured to receive a write command and associated data for a logical unit of storage;
   a storage control module configured to write the associated data to a physical unit of storage within the solid state storage array;
   the storage control module further configured to map the logical unit of storage to the physical unit of storage if the associated data does not comprise a common pattern, wherein the storage control module maps the logical unit of storage to a common pattern by inserting a unique code corresponding to the common pattern into a mapping table; and
   the storage control module further configured to map the logical unit of storage to a common pattern if the associated data comprises a common pattern.

10. The apparatus of claim 9, further comprising a mapping module configured to enable the storage module to map logical units of storage to physical units of storage within the solid state storage array.

11. The apparatus of claim 9, wherein the mapping module is further configured to retrieve a mapping table from the solid state storage array and write an updated version of the mapping table to a different location in the solid state storage array.

12. The apparatus of claim 9, wherein the storage control module is further configured to reclaim a physical unit of storage for wear leveling if the associated data comprises a common pattern.

13. The apparatus of claim 9, wherein the storage control module maps the logical unit of storage to a common pattern by mapping the logical unit of storage to a physical unit of storage corresponding to the common pattern.

14. The apparatus of claim 9, wherein the storage control module maps the logical unit of storage to a common pattern by deleting an entry in a mapping table.

15. The apparatus of claim 9, wherein the common pattern is stored or generated outside of the solid state storage array.

16. A system, the system comprising:
   a solid state storage array;
   an interface module configured to receive a write command and associated data for a logical unit of storage;
   a storage control module configured to write the associated data to a physical unit of storage within the solid state storage array;
   the storage control module further configured to map the logical unit of storage to the physical unit of storage if the associated data does not comprise a common pattern, wherein the storage control module maps the logical unit of storage to a common pattern by inserting a unique code corresponding to the common pattern into a mapping table;
   the storage control module further configured to map the logical unit of storage to a common pattern if the associated data comprises a common pattern;
   a computing device comprising a storage driver configured to receive a delete instruction for a second logical unit of storage; and
   the storage driver further configured to transmit a write command to a storage device to overwrite the second logical unit of storage with a common data pattern.

17. The apparatus of claim 16, further comprising a storage device configured to determine a physical unit of storage corresponding to the second logical unit of storage and reclaim the physical unit of storage.

18. The apparatus of claim 17, wherein the physical unit of storage is reclaimed for wear leveling use.

* * * * *